(No Model.)
S. A. WHITE.
BICYCLE.
No. 505,738. Patented Sept. 26, 1893.
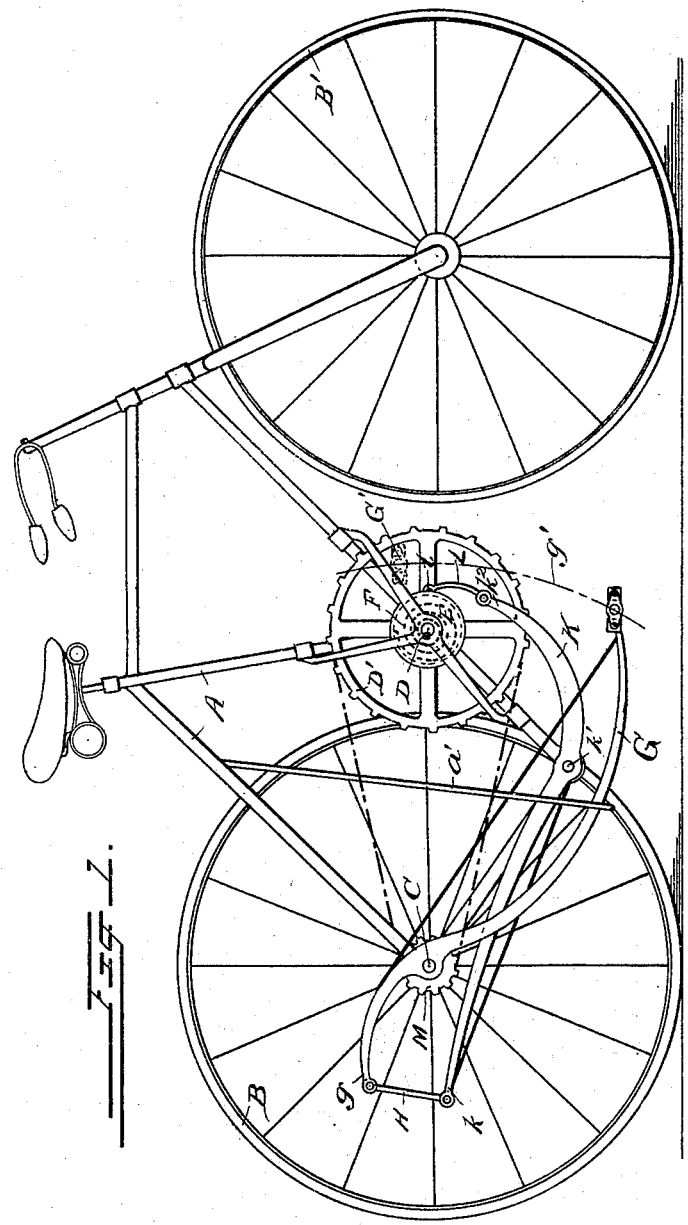
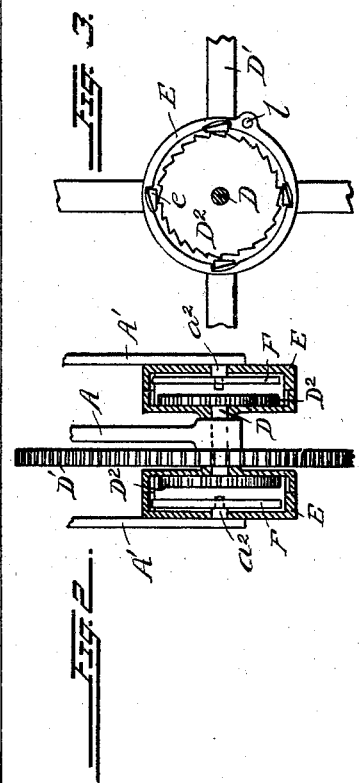
Witnesses
Ed. A. Kelly
David Levan
Samuel A. White, Inventor
By his Attorney

UNITED STATES PATENT OFFICE.

SAMUEL A. WHITE, OF HARRISBURG, ASSIGNOR OF ONE-HALF TO THOMAS K. RICHARDS, OF READING, PENNSYLVANIA.

BICYCLE.

SPECIFICATION forming part of Letters Patent No. 505,738, dated September 26, 1893.

Application filed June 6, 1893. Serial No. 476,731. (No model.)

*To all whom it may concern:*

Be it known that I, SAMUEL A. WHITE, a citizen of the United States, residing at Harrisburg, in the county of Dauphin, State of Pennsylvania, have invented certain Improvements in Bicycles, of which the following is a specification.

My invention relates to bicycles and similar vehicles and consists in an improved propelling mechanism the object of which is to utilize the power of the operator to the best possible advantage and thereby enable him to attain a higher speed, or to climb a steeper hill as the case may be, than is practicable with the usual crank mechanism.

The invention is described in connection with the accompanying drawings and the novel features are specifically pointed out in the claim.

Figure 1 is a side elevation of a form of safety bicycle showing my invention applied thereto. Figs. 2 and 3 are detail views of a ratchet mechanism employed in connection with the operating levers.

A represents the frame of a bicycle having a forward steering wheel B' and a rear driving wheel B, the latter being operated through a sprocket wheel D' fixed to a transverse shaft D located forward of the driving wheel as usual and connected by a chain to a smaller sprocket wheel M fixed to the axle C of the driver.

The shaft D is mounted in the frame A and the sprocket wheel D' and ratchet wheels $D^2$ on opposite ends, are fixed to it. Cylindrical boxes E E are rotatably mounted on the shaft and are provided on their inner peripheries with pallets $e$ which are arranged to engage the notches of the ratchet wheels when the boxes are turned in a forward direction and to be pressed back into recesses in the box when the latter is moved in the opposite direction, thus enabling the vehicle to be propelled by imparting an oscillating movement to the boxes E. The novel mechanism which I employ for effecting this movement consists mainly of a pair of levers on either side of the machine so arranged as to secure the most advantageous application of power. G is the pedal lever which is shown pivoted intermediately of its length on the axle C of the driving wheel. The rearwardly extended end $g$ of this lever is connected by a link H to the end $k$ of the second lever K. This lever K is also pivoted intermediately at a point $k'$ to the frame of the machine, or to a fixture thereon, and its forward end $k^2$, which is arranged below the box E, is connected by a link L to the periphery of the box at $l$.

The drawings show the position of the levers when the pedal is at its lowest point. The pedal lever G preferably moves up and down in a vertical guide $a'$. The upper position of the pedal is indicated in dotted lines at G', it being arranged to move in an arc $g'$ around the center C.

The levers are normally held in raised position by means of springs F which are coiled in the boxes E and fixed at opposite ends respectively to the inner peripheries of the boxes and to the projection $a^2$ from the outer frame bearing A' which latter may be fixed to the frame A as indicated in Fig. 1; these springs being arranged under sufficient tension to overbalance the weight of the levers and to raise them as described.

In pressing the pedal downward the forward end $k^2$ of the second lever K, which is connected to the box E is also moved in the same direction with a considerable increase of power depending in amount upon the relative length of the levers G and K on either side of their pivotal points. The movement of the pedal in a substantially vertical line also permits the power to be applied to the best advantage throughout the whole downward movement though the stroke may of course be made as short as desired and either pedal operated independently.

In order to make the levers G and K as light as possible with the requisite amount of strength I prefer to employ tension rods as shown though of course this construction is not essential. The machine may be readily geared to more or less speed by varying either the ratchet or sprocket wheels.

The mechanism may evidently be modified to adapt it to machines differing in construction from that specifically shown and described.

What I claim is—

In a bicycle or similar vehicle having a driving wheel arranged in gear with a sprocket wheel shaft the pedal lever G fulcrumed intermediately of its length on the rear axle, the lever K linked at its rear end to said pedal lever and fulcrumed at a point between said shaft and axle, and a ratchet mechanism on said shaft operatively connected to said lever K, substantially as set forth.

In testimony whereof I affix my signature in presence of two witnesses.

SAMUEL A. WHITE.

Witnesses:
THOMAS K. RICHARDS,
CAMERON E. STRAUSS.